US009113237B2

(12) United States Patent
Boyd et al.

(10) Patent No.: US 9,113,237 B2
(45) Date of Patent: Aug. 18, 2015

(54) SYSTEMS AND METHODS FOR ETHERNET PASSIVE OPTICAL NETWORK OVER COAXIAL (EPOC) POWER SAVING MODES

(75) Inventors: Edward Wayne Boyd, Petaluma, CA (US); Sanjay Goswami, Santa Rosa, CA (US); Andrew Boyce, Groton, MA (US)

(73) Assignee: Broadcom Corporation, Irvine, CA (US)

( * ) Notice: Subject to any disclaimer, the term of this patent is extended or adjusted under 35 U.S.C. 154(b) by 215 days.

(21) Appl. No.: 13/436,100

(22) Filed: Mar. 30, 2012

(65) Prior Publication Data

US 2013/0202293 A1    Aug. 8, 2013

Related U.S. Application Data

(60) Provisional application No. 61/594,787, filed on Feb. 3, 2012.

(51) Int. Cl.
H04B 10/00     (2013.01)
H04Q 11/00     (2006.01)
H04B 10/2575   (2013.01)

(52) U.S. Cl.
CPC ........ H04Q 11/0067 (2013.01); *H04B 10/2575* (2013.01); *H04B 10/25759* (2013.01); *H04Q 2011/0079* (2013.01)

(58) Field of Classification Search
None
See application file for complete search history.

(56) References Cited

U.S. PATENT DOCUMENTS

| 6,584,330 | B1 * | 6/2003 | Ruuska ......................... 455/574 |
| 7,734,179 | B1 * | 6/2010 | Darcie et al. .................... 398/72 |
| 7,742,458 | B2 * | 6/2010 | Sharma et al. ................ 370/347 |
| 7,782,930 | B2 * | 8/2010 | Locke ........................... 375/222 |
| 8,433,195 | B2 * | 4/2013 | Biegert et al. ................... 398/72 |
| 8,498,534 | B2 * | 7/2013 | Hirth et al. ...................... 398/25 |
| 8,554,082 | B2   | 10/2013 | Boyd et al. |
| 8,848,523 | B2   | 9/2014 | Boyd et al. |
| 2005/0250452 | A1 * | 11/2005 | Walton et al. ................ 455/63.4 |
| 2006/0029389 | A1   | 2/2006 | Cleary et al. |

(Continued)

FOREIGN PATENT DOCUMENTS

| CN | 101282315 A | 10/2008 |
| CN | 101882960 A | 11/2010 |
| JP | 2010-213259 | 9/2010 |

OTHER PUBLICATIONS

Hura et al., Data and Computer Communications: Networking and Internetworking, 2001, CRC Press LLC, pp. 181-184.*

(Continued)

*Primary Examiner* — Ken Vanderpuye
*Assistant Examiner* — Jai Lee
(74) *Attorney, Agent, or Firm* — Sterne, Kessler, Goldstein & Fox PLLC

(57) ABSTRACT

Systems and methods for Ethernet Passive Optical Network Over Coaxial (EPOC) power saving modes are provided. The EPOC power savings modes allow an EPOC coaxial network unit (CNU) to enter a sleep mode based on user traffic characteristics. The sleep mode may include powering down one or more module of the EPOC CNU, including radio frequency (RF) transmit/receive circuitry and associated circuitry. In embodiments, the EPOC CNU may enter sleep mode based on instructions from an optical line terminal (OLT) or based on its own determination. Embodiments further include systems and methods that allow the EPOC CNU to maintain synchronization with a servicing coaxial media converter (CMC) when it enters a sleep mode.

21 Claims, 8 Drawing Sheets

(56) References Cited

U.S. PATENT DOCUMENTS

| | | | |
|---|---|---|---|
| 2009/0060530 A1 | 3/2009 | Biegert et al. | |
| 2009/0290632 A1 | 11/2009 | Wegener | |
| 2010/0111081 A1* | 5/2010 | Diab | 370/389 |
| 2010/0111523 A1 | 5/2010 | Hirth et al. | |
| 2010/0111524 A1 | 5/2010 | Yu | |
| 2010/0118753 A1 | 5/2010 | Mandin et al. | |
| 2012/0188885 A1* | 7/2012 | Tazebay et al. | 370/252 |
| 2012/0257897 A1* | 10/2012 | Hu et al. | 398/76 |
| 2013/0004155 A1* | 1/2013 | Liang et al. | 398/9 |
| 2013/0142515 A1* | 6/2013 | Chen et al. | 398/67 |

OTHER PUBLICATIONS

Mahadevan, Rajeevan, A Front-end Circuit for Full-duplex Transmission over Coaxial Cable, 1999, pp. 1-2.*

Anderson, John B., Digital Transmission Engineering, 2005, IEEE Press, 2nd Ed., pp. 161-163.*

Goldsmith, Andreas, Wireless Communication, 2005, Cambridge University Press, pp. 283-286.*

Hu et al., Energy Efficient OFDM Transceiver based on Traffic Tracking and Adaptive Bandwidth Adjustment, 2011, ECOC Technical Digest, pp. 1-3.*

Tang et al., High-Speed Transmission of Adaptively Modulated Optical OFDM Signals Over Multimode Fibers Using Directly Modulated DFBs, 2006, IEEE, pp. 429-441.*

Office Action directed to related Korean Patent Application No. 10-2013-0012367, mailed Mar. 12, 2014; 4 pages.

English-language abstract for Japanese Patent Application Publication No. 2010-213259; 2 pages.

English Language Abstract for CN101882960 A, published Nov. 10, 2010; 2 pages.

* cited by examiner

SYSTEMS AND METHODS FOR ETHERNET PASSIVE OPTICAL NETWORK OVER COAXIAL (EPOC) POWER SAVING MODES

CROSS-REFERENCE TO RELATED APPLICATIONS

The present application claims the benefit of U.S. Provisional Patent Application No. 61/594,787 filed on Feb. 3, 2012, which is incorporated herein by reference in its entirety.

BACKGROUND

1. Field of the Invention

The present disclosure relates generally to Ethernet.

2. Background Art

A Passive Optical Network (PON) is a single, shared optical fiber that uses inexpensive optical splitters to divide a single fiber into separate strands feeding individual subscribers. An Ethernet PON (EPON) is a PON based on the Ethernet standard. EPONs provide simple, easy-to-manage connectivity to Ethernet-based, IP equipment, both at customer premises and at the central office. As with other Gigabit Ethernet media, EPONs are well-suited to carry packetized traffic. An Ethernet Passive Optical Network Over Coax (EPOC) is a network that enables EPON connectivity over a coaxial network.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
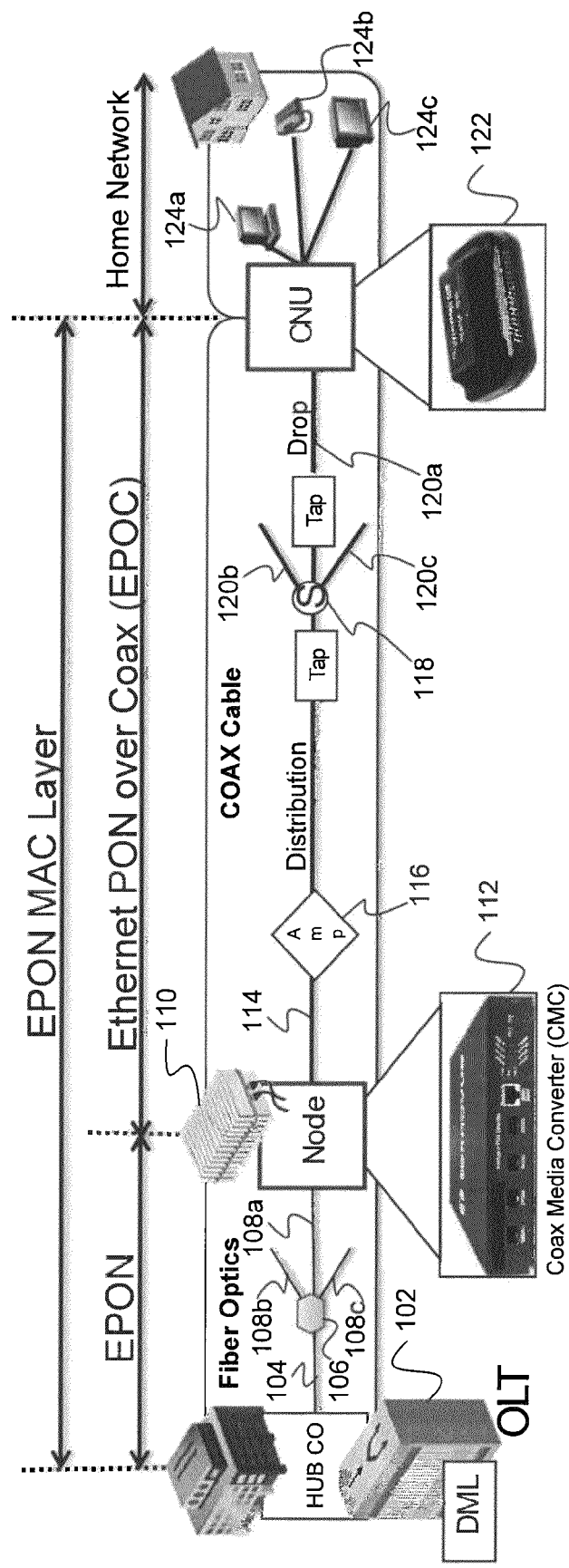
FIG. 1 illustrates an example hybrid Ethernet Passive Optical Network (EPON)-Ethernet Passive Optical Network Over Coax (EPOC) network architecture.

FIG. 1 illustrates an example hybrid Ethernet Passive Optical Network (EPON)-Ethernet Passive Optical Network Over Coax (EPOC) network architecture 100 according to an embodiment of the present disclosure. As shown in FIG. 1, example network architecture 100 includes an Optical Line Terminal (OLT) 102, an optional optical passive splitter 106, a communications node 110 including a coaxial media converter (CMC), an optional amplifier 116, an optional coaxial splitter 118, a coaxial network unit (CNU) 122, and a plurality of subscriber media devices 124.

OLT 102 sits at a central office (CO) of the network and is coupled to a fiber optic line 104. OLT 102 may implement a DOCSIS (Data Over Cable Service Interface Specification) Mediation Layer (DML) which allows OLT 102 to provide DOCSIS provisioning and management of network components (e.g., CMC, CMU, Optical Network Unit (ONU)). Additionally, OLT 102 implements an EPON Media Access Control (MAC) layer (e.g., IEEE 802.3ah).

Optionally, passive splitter 106 can be used to split fiber optic line 104 into a plurality of fiber optic lines 108. This allows multiple subscribers in different geographical areas to be served by the same OLT 102 in a point-to-multipoint topology.

Communications node 110 serves as a converter (or switch/repeater) between the EPON side and the EPOC side of the network. Accordingly, node 110 is coupled from the EPON side of the network to a fiber optic line 108a, and from the EPOC side of the network to a coaxial cable 114. In an embodiment, communications node 110 includes a coaxial media converter (CMC) 112 that allows EPON to EPOC (and vice versa) repeating and conversion.

CMC 112 performs physical layer (PHY) conversion from EPON to EPOC, and vice versa. In an embodiment, CMC 112 includes a first interface (not shown in FIG. 1), coupled to fiber optic line 108, configured to receive a first optical signal from OLT 102 and generate a first bitstream having a first physical layer (PHY) encoding. In an embodiment, the first PHY encoding is EPON PHY encoding. CMC 112 also includes a PHY conversion module (not shown in FIG. 1), coupled to the first interface, configured to perform PHY layer conversion of the first bitstream to generate a second bitstream having a second PHY encoding. In an embodiment, the second PHY encoding is EPOC PHY encoding. Furthermore, CMC 112 includes a second interface (not shown in FIG. 1), coupled to the PHY conversion module and to coaxial cable 114, configured to generate a first radio frequency (RF) signal from the second bitstream and to transmit the first RF signal over coaxial cable 114.

In EPOC to EPON conversion (i.e., in upstream communication), the second interface of CMC 112 is configured to receive a second RF signal from CNU 122 and generate a third bitstream therefrom having the second PHY encoding (e.g., EPOC PHY encoding). The PRY conversion module of CMC 112 is configured to perform PHY layer conversion of the third bitstream to generate a fourth bitstream having the first PHY encoding (e.g., EPON PHY encoding). Subsequently, the first interface of CMC 112 is configured to generate a second optical signal from the fourth bitstream and to transmit the second optical signal to OLT 102 over fiber optic line 108.

Optionally, an amplifier 116 and a second splitter 118 can be placed in the path between communications node 110 and CNU 122. Amplifier 116 amplifies the RF signal over coaxial cable 114 before splitting by second splitter 118. Second splitter 118 splits coaxial cable 114 into a plurality of coaxial cables 120, to allow service over coaxial cables of several subscribers which can be within same or different geographic vicinities.

CNU 122 generally sits at the subscriber end of the network. In an embodiment, CNU 122 implements an EPON MAC layer, and thus terminates an end-to-end EPON MAC link with OLT 102. Accordingly, CMC 112 enables end-to-end provisioning, management, and Quality of Service (QoS) functions between OLT 102 and CNU 122. CNU 122 also provides multiple Ethernet interfaces that could range between 10 Mbps to 10 Gbps, to connect subscriber media devices 124 to the network. Additionally, CNU 122 enables gateway integration for various services, including VOIP (Voice-Over-IP), MoCA (Multimedia over Coax Alliance), HPNA (Home Phoneline Networking Alliance), Wi-Fi (Wi-Fi Alliance), etc. At the physical layer, CNU 122 may perform physical layer conversion from coaxial to another medium, while retaining the EPON MAC layer.

According to embodiments, EPON-EPOC conversion can occur anywhere in the path between OLT 102 and CNU 122 to provide various service configurations according to the services needed or infrastructure available to the network. For example, CMC 112, instead of being integrated within node 110, can be integrated within OLT 102, within amplifier 116, or in an Optical Network Unit (ONU) located between OLT 102 and CNU 122 (not shown in FIG. 1).

Figure 2:
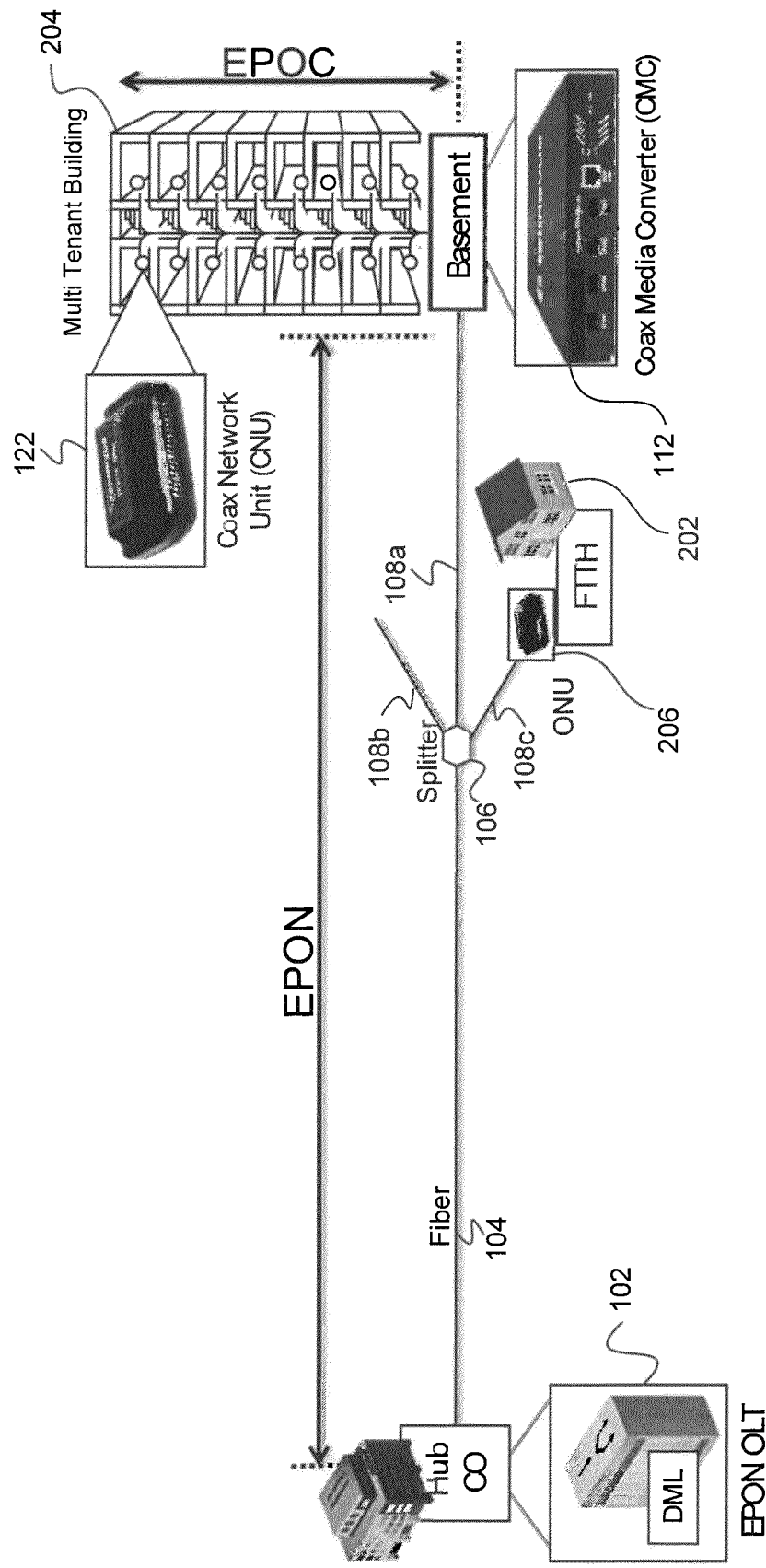
FIG. 2 illustrates another example hybrid EPON-EPOC network architecture.

FIG. 2 illustrates another example hybrid EPON-EPOC network architecture 200 according to an embodiment of the present disclosure. In particular, example network architecture 200 enables simultaneous FTTH (Fiber to the Home) and multi-tenant building EPOC service configurations.

Example network architecture 200 includes similar components as described above with reference to example network architecture 100, including an OLT 102 located in a CO hub, a passive splitter 106, a CMC 112, and one or more CNUs 122. OLT 102, splitter 106, CMC 112, and CNU 122 operate in the same manner described above with reference to FIG. 1.

CMC 112 sits, for example, in the basement of a multi-tenant building 204. As such, the EPON side of the network extends as far as possible to the subscriber, with the EPOC side of the network only providing short coaxial connections between CMC 112 and CNU units 122 located in individual apartments of multi-tenant building 204.

Additionally, example network architecture 200 includes an Optical Network Unit (ONU) 206. ONU 206 is coupled to OLT 102 through an all-fiber link, comprised of fiber lines 104 and 108c. ONU 206 enables FTTH service to a home 202, allowing fiber optic line 108c to reach the boundary of the living space of home 202 (e.g., a box on the outside wall of home 202).

Accordingly, example network architecture 200 enables an operator to service both ONUs and CNUs using the same OLT. This includes end-to-end provisioning, management, and QoS with a single interface for both fiber and coaxial subscribers. In addition, example network architecture 200 allows for the elimination of the conventional two-tiered management architecture, which uses media cells at the end user side to manage the subscribers and an OLT to manage the media cells.

Figure 3:
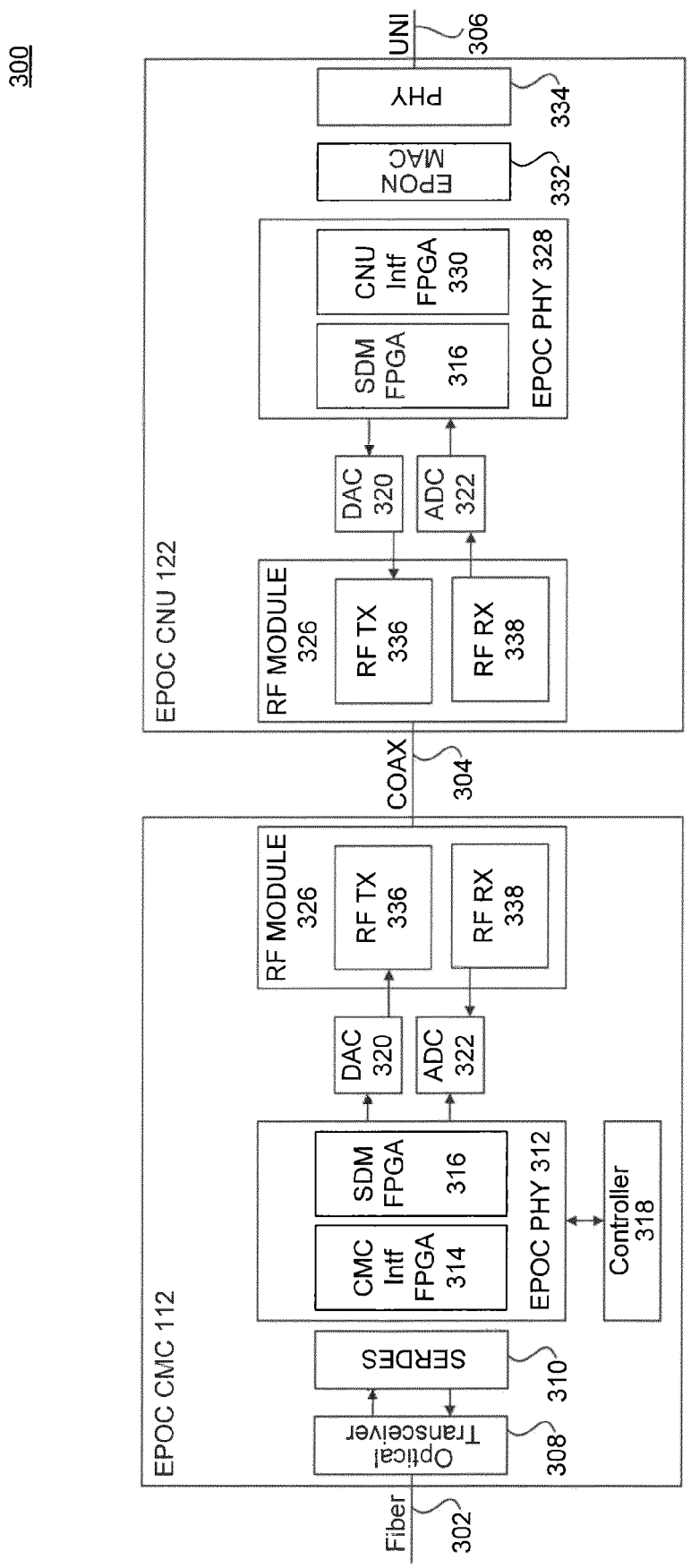
FIG. 3 illustrates an example EPOC portion of a hybrid EPON-EPOC network according to an embodiment of the present disclosure.

FIG. 3 illustrates an example implementation 300 of an EPOC portion of a hybrid EPON-EPOC network. Example implementation 300 may be an embodiment of the EPOC portion of example EPON-EPOC network 100, described in FIG. 1, or example EPON-EPOC network 200, described above in FIG. 2. As shown in FIG. 3, the EPOC portion includes an EPOC CMC 112 and an EPOC CNU 122, connected via a coaxial network 304.

EPOC CMC 112 includes an optical transceiver 308, a serializer-deserializer (SERDES) module 310, an EPOC PHY module 312, including, in an embodiment, a CMC Interface Field Programmable Gated Array (FPGA) 314 and a Sub-band Division Multiplexing (SDM) FPGA 316, a controller module 318, an analog-to-digital converter (ADC) 322, digital-to-analog converters (DACs) 320, and an radio frequency (RF) module 326, including RF transmit (TX) circuitry 336 and RF receive (RX) circuitry 338.

Optical transceiver 308 may include a digital optical receiver configured to receive an optical signal over a fiber optic cable 302 coupled to CMC 112 and to produce an electrical data signal therefrom. Fiber optic cable 302 may be part of an EPON network that connects CMC 112 to an OLT, such as OLT 102. Optical transceiver 307 may also include a digital optical laser to produce an optical signal from an electrical data signal and to transmit the optical signal over fiber optic cable 302.

SERDES module 310 performs parallel-to-serial and serial-to-parallel conversion of data between optical transceiver 308 and EPOC PHY 312. Electrical data received from optical transceiver 308 is converted from serial to parallel for further processing by EPOC PHY 312. Likewise, electrical data from EPOC PHY 312 is converted from parallel to serial for transmission by optical transceiver 308.

EPOC PHY module 312, optionally with other modules of CMC 112, forms a two-way PHY conversion module. In the downstream direction (i.e., traffic to be transmitted to EPOC GNU 122), EPOC PHY 312 performs PHY level conversion from EPON PHY to coaxial PHY and spectrum shaping of downstream traffic. For example, CMC interface FPGA 314 may perform line encoding functions, Forward Error Correction (FEC) functions, and framing functions to convert EPON PHY encoded data into coaxial PHY encoded data. SDM FPGA 316 may perform SDM functions, including determining sub-carriers for downstream transmission, determining the width and frequencies of the sub-carriers, selecting the modulation order for downstream transmission, and dividing downstream traffic into multiple streams each for transmission onto a respective sub-carrier of the sub-carriers. In the upstream direction (i.e., traffic received from EPOC CNU 112), EPOC PHY 312 performs traffic assembly and PHY level conversion from coaxial PHY to EPON PHY. For example, SDM FPGA 316 may assemble streams received over multiple sub-carriers to generate a single stream. Then, CMC Interface FPGA 314 may perform line encoding functions, FEC functions, and framing functions to convert coaxial PHY encoded data into EPON PHY encoded data. Detailed description of exemplary implementations and the operation of CMC 112, including functions performed by EPOC PHY 312, can be found in U.S. application Ser. No. 12/878,643, filed Sep. 9, 2010, which is incorporated herein by reference in its entirety.

As would be understood by a person of skill in the art based on the teachings herein, SDM as described above may include any one of transmission technologies that transmit/receiver data onto multiple carriers, including multi-carrier technologies such as Orthogonal Frequency Division Multiplexing (OFDM), wavelet OFDM, Discrete Wavelet Multitone (DWMT), for example, or single-carrier technologies with channel bonding, such as multiple bonded Quadrature Amplitude Modulation (QAM) channels.

Controller module 318 provides software configuration, management, and control of EPOC PHY 312, including CMC Interface FPGA 314 and SDM FPGA 316. In addition, controller module 318 registers CMC 112 with the OLT servicing CMC 112. In an embodiment, controller module 318 is an ONU chip, which includes an EPON MAC module.

DAC 320 and ADC 322 sit in the data path between EPOC PHY 312 and RF module 326, and provide digital-to-analog and analog-to-digital data conversion, respectively, between EPOC PHY 312 and RF module 326. In an embodiment, RF module 326 performs Pulse Amplitude Modulation (PAM) encoding on the plurality of sub-carriers formed by SDM FPGA 316.

RF module 326 allows CMC 112 to transmit/receive RF signals over coaxial network 304. In other embodiments, RF module 326 may be external to CMC 112. RF module 326 sets the frequency of operation and the RF power level over Coax Cable 114. RF TX circuitry 336 includes RF transmitter and associated circuitry (e.g., mixers, frequency synthesizer, voltage controlled oscillator (VCO), phase locked loop (PLL), power amplifier (PA), analog filters, matching networks, RF power level detection, Automatic Gain Control (AGC) etc.). RF RX circuitry 338 includes RF receiver and associated circuitry (e.g., mixers, frequency synthesizer, VCO, PLL, low-noise amplifier (LNA), Automatic Gain Control (AGC), analog filters, etc.).

EPOC CNU 122 includes RF module 326, including RF TX circuitry 336 and RF RX circuitry 338, DACs 320, ADC 322, an EPOC PHY module 328, including SDM FPGA 316 and a CNU Interface FPGA 330, an EPOC MAC module 332, and a PHY module 334.

RF module 326, DACs 320, ADC 322, and SDM FPGA 316 may be as described above with respect to EPOC CMC 112. Accordingly, their operation in processing downstream traffic (i.e., traffic received from CMC 112) and upstream traffic (i.e., traffic to be transmitted to CMC 112), which should be apparent to a person of skill in the art based on the teachings herein, is omitted.

CNU Interface FPGA 330 provides an interface between SDM FPGA 316 and EPON MAC 332. As such, CNU Interface FPGA 330 may perform coaxial PHY level decoding functions, including line decoding and FEC decoding. EPON MAC module 332 implements an EPON MAC layer, including the ability to receive and process EPON Operation, Administration and Maintenance (OAM) messages, which may be sent by an OLT and forwarded by CMC 112 to CNU 122. In addition, EPON MAC 332 interfaces with a PHY module 334, which may implement an Ethernet PHY layer. PHY module 334 enables physical transmission over a user-network interface (UNI) 306 (e.g., Ethernet cable) to a connected user equipment.

Figure 4:
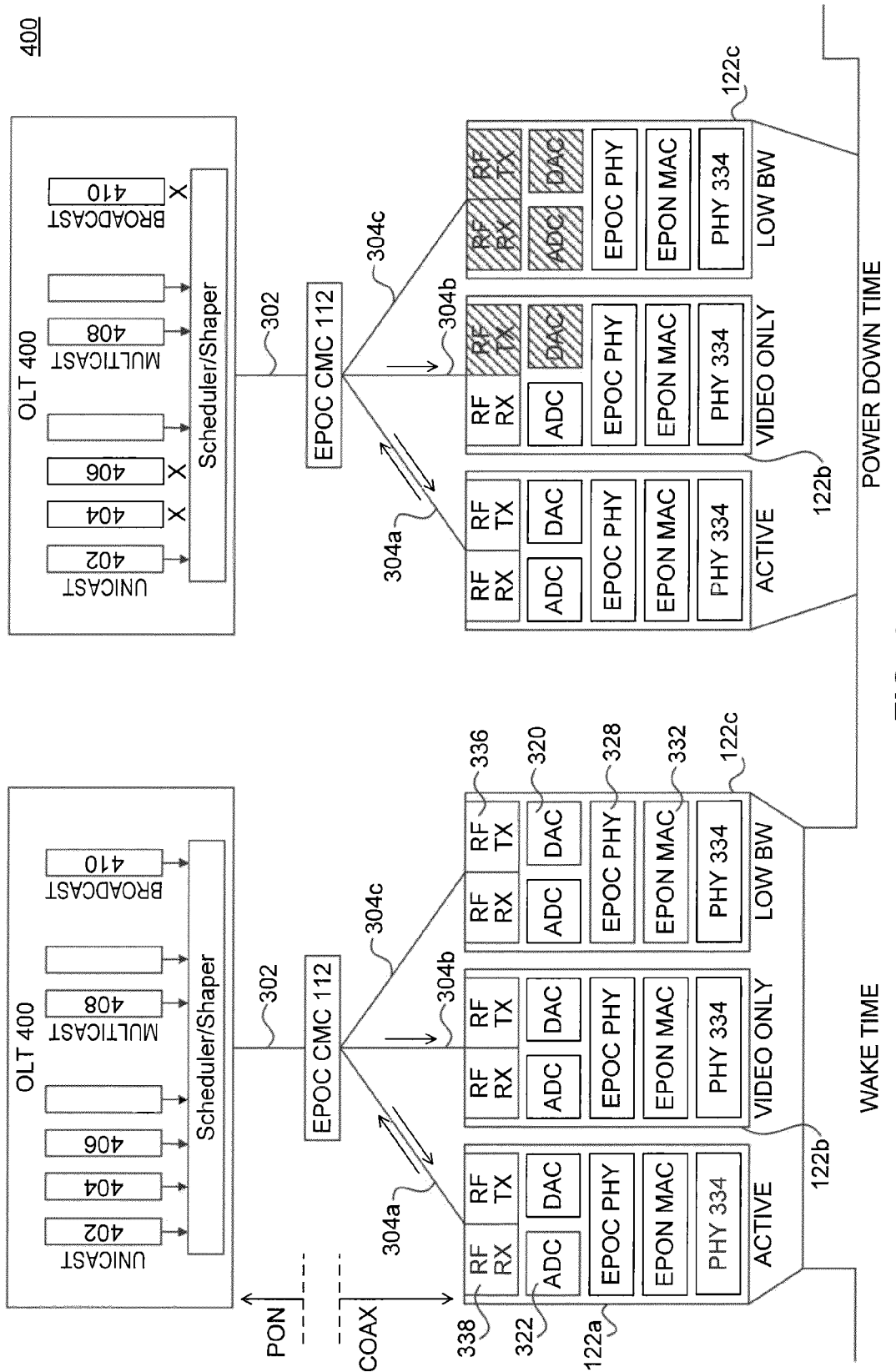
FIG. 4 illustrates an EPOC power saving mode according to an embodiment of the present disclosure.

FIG. 4 illustrates an EPOC power saving mode according to an embodiment of the present disclosure. The EPOC power saving mode is illustrated with respect to an example scenario 400 in a hybrid EPON-EPOC network, including an OLT 400, an EPOC CMC 112, and three EPOC CNUs 122a-c. OLT 400 and CMC 112 are connected via fiber optic cable 302, which may be part of an EPON network. CMC 112 connects to EPOC CNUs 122a-c via coaxial cables 304a-c, respectively. EPOC CMC 112 may be implemented as described above in FIG. 3, for example. EPOC CNUs 122a-c are implemented as described above in FIG. 3.

OLT 400 includes a plurality of unicast queues, including queues 402, 404, and 406, a plurality of multicast queues, including queue 408, and a broadcast queue 410. Unicast queues are designated for unicast traffic destined to specific ONUs/CNUs. For example, queues 402, 404, and 406 store unicast traffic destined to CNUs 122a, 122b, and 122c, respectively. Multicast queues are designated for multicast traffic, which is transmitted to a select multicast group. The multicast group includes multiple ONUs and/or CNUs, the users of which have subscribed to receiving the multicast traffic. Broadcast queue 410 is designated for broadcast traffic, which is typically transmitted to every ONU/CNU in the network. In addition, OLT 400 includes a scheduler/shaper, which receives traffic from the different queues and schedules traffic transmissions over fiber optic line 302.

For illustration, it is assumed that CNU 122a is active by transmitting upstream traffic to OLT 400 and receiving downstream traffic from OLT 400, via CMC 112. Unicast traffic destined to CNU 122a is stored in unicast queue 402 of OLT 400. CNU 1122b is assumed to be only receiving downstream multicast traffic from OLT 400. The downstream multicast traffic that CNU 122b is receiving is stored in multicast queue 408 of OLT 400. CNU 122c is assumed to be operating with low bandwidth usage. For example, traffic from CNU 122c may include routing or network management traffic, and no or low user traffic.

As shown in FIG. 4, the EPOC power saving mode includes a wake time and a power down time. In embodiments, the wake time and the power down are programmable, and may repeat periodically for a particular CNU so long that traffic conditions remain the same for the particular CNU. During the wake time, all three of CNUs 122a-c are fully powered up, including all of their transmit and receive circuitry (e.g., DAC 320, ADC 322, RF TX circuitry 336, and RF RX circuitry 338). In OLT 400, all unicast queues 402, 404, and 404 continue to forward their unicast traffic to the scheduler/shaper for transmission to the respective CNUs.

In the power down time, one or more of CNUs 122a-c may enter a sleep mode. The sleep mode may vary from one CNU to another and may be triggered by OLT 400 and/or by the CNU itself. In an embodiment, OLT 400 determines which of CNUs 122a-c should enter a sleep mode. For example, OLT 400 may analyze one or more of upstream traffic and downstream traffic from each CNU to determine if the CNU's upstream traffic satisfies sleep mode conditions (e.g., no upstream user traffic, low upstream bandwidth usage, etc.).

If the sleep mode conditions are satisfied by a CNU, OLT 400 determines an appropriate sleep mode for the CNU and instructs the CNU to enter the sleep mode via a control message. The control message may be an EPON OAM message, instructing the GNU to enter the sleep for a predefined duration. In another embodiment, the same sleep mode is used for all sleep eligible CNUs. In another embodiment, CMC 112, based on observed traffic from the CNU at CMC 112 and/or OLT 400, may adjust the downstream data rate and/or spectrum. For example, in light of low downstream traffic load (that it observes or that OLT 400 observes), CMC 112 may lower the data rate of the downstream channel (sub-rating). Alternatively, or additionally, CMC 112 may reduce the modulation order, transmit power, or reduce the amount of downstream spectrum, to save power. Similarly, if CMC 112 determines that upstream traffic is low, it may reduce the upstream data rate (e.g., from 10G to 1G). The lower switching rate and the ability to decrease the transmit power on the upstream laser also saves power.

For example, in scenario 400, OLT 400 may determine that CNU 122b, which is only receiving multicast traffic, and CNU 122c, which has a low bandwidth usage, are sleep mode eligible. Accordingly, OLT 400 may instruct GNUs 122b and 122c to enter a sleep mode. In an embodiment, the sleep mode of CNU 122b includes powering down DAC 320 and RF TX circuitry 336 for a predefined duration. The sleep mode of CNU 122c includes powering down DAC 320 and RF TX circuitry 336 as well as ADC 322 and RF RX circuitry 338, for a predefined power down time.

During the power down time, OLT 400 assumes that CNUs 112b and 112c have entered the sleep mode and thus stops forwarding unicast traffic destined to CNUs 122b and 122c to the scheduler/shaper, for transmission to CNUs 112*b* and 112*c*. Instead, OLT 400 buffers the unicast traffic in unicast queues 404 and 406 until the next wake time period. Similarly, broadcast traffic, which is sent to all ONUs/CNUs serviced by OLT 400, is queued in broadcast queue 410 until the next wake time period. Multicast traffic, however, continues to be transmitted in the power down time. In another embodiment, CMC 112 also stops forwarding unicast traffic destined to CNUs 122*b* and 122*c*, which have entered sleep mode.

In another embodiment, OLT 400 determines which of CNUs 122*a-c* should enter a sleep mode and instructs sleep eligible CNUs to enter the sleep mode by only specifying a power down time and a wake time. A sleep eligible CNU, receiving sleep mode instructions from OLT 400, thus makes an autonomous determination as to whether to enter the specified sleep mode and which components to power down during the power down time of the sleep mode. For example, CNU 122*b* may decide, upon receiving sleep mode instructions, whether or not to it may power down its RF RX circuitry. In example scenario 400, since CNU 122*b* is receiving multicast traffic, CNU 122*b* decides to only power down its DAC 320 and RF TX circuitry 336 and to maintain its ADC 322 and RF RX circuitry 338 powered up. Any SERDES channels between the DAC 320 and EPOC PHY 328 may also be powered off. In addition, any modulation logic outside RF TX circuitry 336 can be powered off as well.

Alternatively, or additionally, sleep mode eligibility may be performed individually by each CNU by analyzing its own upstream and downstream traffic and determining traffic characteristics. Based on the traffic characteristics, each CNU selects an appropriate sleep mode if sleep mode conditions are met and enters the selected sleep mode. In an embodiment, the CNU notifies CMC 112 that it intends to enter the selected sleep mode. CMC 112 may then buffer downstream traffic destined to the CNU for the power down time duration. Alternatively, CNU notifies OLT 400, which buffers unicast traffic destined to the CNU. At the user side, PHY module 334, EPON MAC 332 and EPOC PHY 328 are maintained powered on in order to receive any upstream user traffic from UNI 306. The upstream user traffic is buffered in EPON MAC 332 or EPOC PHY 328, for example, until the next wake time.

Figure 5:
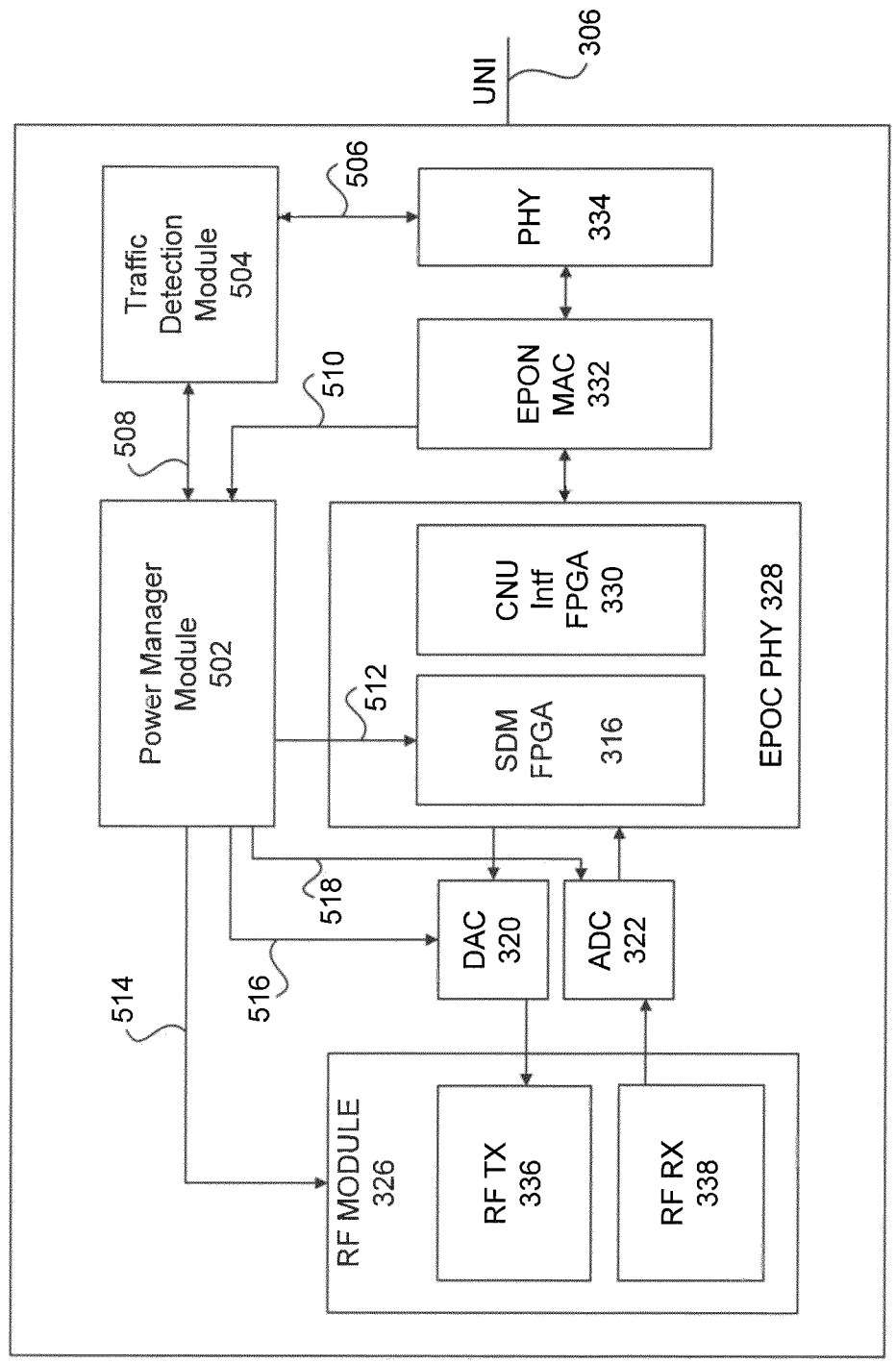
FIG. 5 illustrates an example EPOC coaxial network unit (CNU) with sleep mode features according to an embodiment of the present disclosure.

FIG. 5 illustrates an example EPOC CNU 500 with sleep mode features according to an embodiment of the present disclosure. Example CNU 500 is provided for the purpose of illustration and is not limiting. As shown in FIG. 5, example CNU 500 includes similar components as described above in FIG. 3 with respect to EPOC CNU 122. In addition, CNU 500 includes a power manager module 502 and a traffic detection module 504.

In an embodiment, EPON MAC module 332 is configured to receive a control message containing instructions to enter a sleep mode. The control message may include an EPON OAM message from an OLT. The sleep mode may define a power down time and a wake time cycle. Additionally, the sleep mode may specify particular CNU components to power down during the power down time. In response to the control message, EPON MAC 332 may communicate the sleep mode instructions to power manager module 502 via a control signal 510. Alternatively, or additionally, EPON MAC 332 communicates the sleep mode instructions to traffic detection module 504.

Upon receiving control signal 510, in an embodiment, power manager module 502 communicates with traffic detection module 504 and instructs traffic detection module 504 to analyze traffic at CNU 500 and to determine predefined traffic characteristics. In an embodiment, power manager module 502 and traffic detection module 504 are configured to communicate via a two-way interface 508. In another embodiment, power manager module 502 is configured to act on the sleep mode instructions contained in control signal 510 without relying on traffic detection module 504.

Traffic detection module 504 is connected via a two-way interface 506 with PHY module 334. PHY module 334 is configured to couple CNU 500 to UNI 306. As such, traffic detection module 504 may be configured to monitor bit streams within PHY module 334. By monitoring bit streams within PHY module 334, traffic detection module 504 may determine traffic characteristics of upstream and downstream user traffic through CNU 500. Traffic detection module 504 then communicates the determined traffic characteristics to power manager module 502 via interface 508. The traffic characteristics may include, for example and without limitation, one or more of the presence of upstream data traffic, the absence of upstream data traffic, the presence of downstream data traffic, the absence of downstream data traffic, presence/absence of active joined multicast groups, and upstream bandwidth capacity usage (e.g., ratio of average upstream data rate to upstream bandwidth capacity). In an embodiment, traffic detection includes packet inspection to determine traffic activity based on select types of packets. For example, traffic activity may be determined based on data packets, not on management/control frames. According to embodiments, the type of packets to use to determine packet activity is configurable.

Power manager module 502 is configured to determine a power profile based on the traffic characteristics received from traffic detection module 504. The power profile, in addition to the wake time and the power down time specified in the control message, may specify one or more modules of CNU 500 to power down during the power down time of the sleep mode. Power manager module 502 then controls CNU 500 in accordance with the determined power profile, which may include powering down one or more modules of CNU 500. Power manager module 502 may determine power profiles based on traffic characteristics according to various case scenarios. For example, and without limitation, power manager module 502 may perform the following exemplary case scenarios.

When the traffic characteristics indicate the absence of upstream data traffic at CNU 500, power manager module 502 may be configured to power down RF TX circuitry 336 and DAC 320 of CNU 500 for a duration defined by the sleep mode. In an embodiment, power manager module 502 controls RF TX circuitry 336 and DAC 320 using control signals 514 and 516, respectively. Individual respective controls for RF TX circuitry 336 and RF RX circuitry 338 may also be used in order to control RF TX circuitry 336 and RF RX circuitry 338 independently of each other.

When the traffic characteristics indicate the absence of downstream data traffic, power manager module 502 may be configured to power down RF RX circuitry 338 and ADC 322 for a duration defined by the sleep mode. In an embodiment, power manager module 502 controls RF RX circuitry 338 and ADC 322 using control signals 514 and 518, respectively.

When the traffic characteristics indicate the upstream bandwidth capacity usage is below a predefined threshold, power manager module 502 may be configured to power down one or more of RF TX circuitry 336, DAC 320, RF RX circuitry 338, and ADC 322 for a duration defined by the sleep mode. In another embodiment, wherein the traffic characteristics indicate the upstream bandwidth capacity usage is below a predefined threshold, power manager module 502 may be configured to control EPOC PHY 328 using control signal 512 (via SDM FPGA 316, for example) to reduce one or more of (a) a number of frequency sub-carriers used for upstream transmission; (b) frequencies of frequency sub-carriers used for upstream transmission; (c) a modulation order used for upstream transmission; and (d) a symbol rate of the transmitter. These steps, alone or in combination, reduce the transmission power used by CNU 500 for upstream transmission.

In another embodiment, CNU 500 may determine independently whether or not to enter sleep mode, without being instructed to do so by an OLT control message. In this embodiment, traffic detection module 504 and power manager module 502 may still operate as described above to select and enter a sleep mode as appropriate based on user traffic at CNU 500.

It is noted that in all cases CMC 112 is preferably maintained powered on at all time. This is because CMC 112 services several CNUs, some of which may continue to be active. In addition, CMC 112 needs to maintain the CNUs that it services registered with the OLT. Further, in embodiments, CMC 112 provides a hold over mode for CNUs that enter sleep mode. The hold over mode allows CNUs that enter sleep mode to maintain synchronization with CMC 11.2 even when they power down their RF TX/RX circuitry. As such, when a CNU wakes up, it can immediately start to transmit/receive traffic to/from CMC 112, without the need to wait for its timing recovery circuitry, (e.g., PLLs) to lock onto the CMC clock, which typically requires a relatively long time.

As described above in FIG. 4, during the power down time of a sleep mode, OLT 400 stops sending unicast traffic to CNUs that it determines to be sleep mode eligible. With broadcast traffic also stopped, a CNU that enters sleep mode has no traffic reaching it. In the hold over mode, CMC 112 continues to send a pilot tone on a specified frequency of the spectrum to CNUs that enter sleep mode. The GNUs, as further described below, may be configured to extract the pilot tone independently of their RF TX/RX circuitry, thereby maintaining synchronization with CMC 112 during sleep mode.

Figure 6:
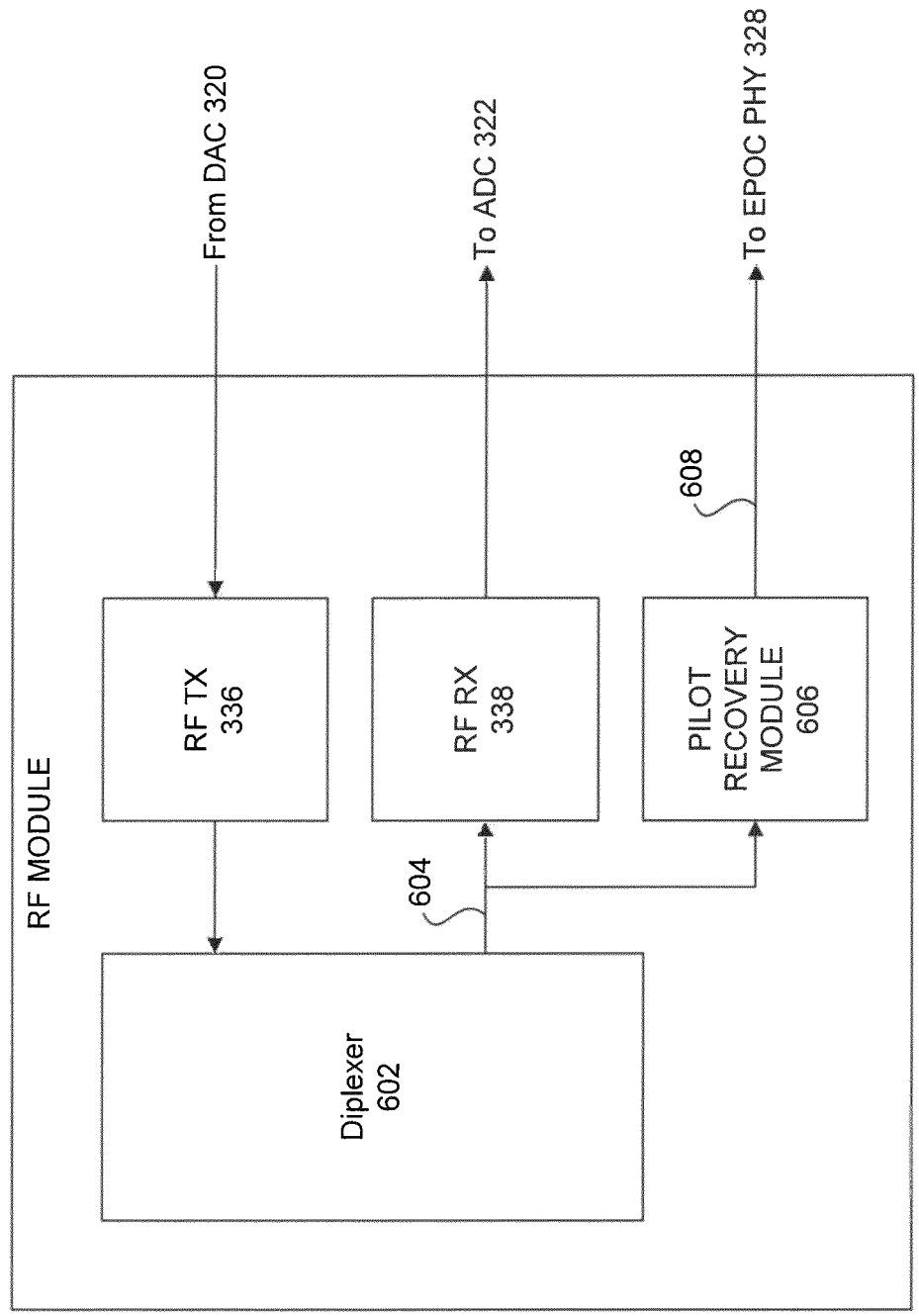
FIG. 6 illustrates an example CNU RF module according to an embodiment of the present disclosure.

FIG. 6 illustrates an example CNU RF module 600 according to an embodiment of the present disclosure. Example CNU RF module 600 is provided for the purpose of illustration and is not limiting. As shown in FIG. 6, RF module 600 includes RF TX circuitry 336, RF RX circuitry 338, a diplexer 602, and a pilot recovery module 606. RF TX circuitry 336 and RF RX circuitry may be as described above in FIG. 3. Diplexer 602 is configured to couple RF TX circuitry 336 and RF RX circuitry 338 to the coaxial cable during transmit and receive timeslots, respectively.

Pilot recovery module 606 is coupled to an input terminal 604 of RF RX circuitry 338. As such, pilot recovery module 606 may be configured to receive the same downstream RF signal as RF RX circuitry 338. As such, even when RF RX circuitry 338 is powered down in sleep mode, synchronization between the CNU and the CMC can be maintained using pilot recovery module 606.

In an embodiment, pilot recovery module 606 is configured to extract only a pilot tone 608 that sits at a known frequency from the downstream spectrum. The pilot tone provides a reference clock signal from the CMC. In an embodiment, pilot tone 608 may be extracted from the downstream spectrum by filtering the downstream spectrum at the known frequency, without a need to sample the filtered signal. Accordingly, ADC 322 may be powered down if needed.

Pilot recovery module 606 provides pilot tone 608 to EPOC PHY 328 of the CNU. EPOC PHY 328 uses pilot tone 608 as a reference clock for its timing recovery module (e.g., PLL) to lock to. As such, EPOC PHY 328 can maintain synchronization with its counterpart EPOC PHY 312 at the CMC, even when both RF TX circuitry 336 and RF RX circuitry 338 are powered down and no data traffic reaches the CNU.

Figure 7:
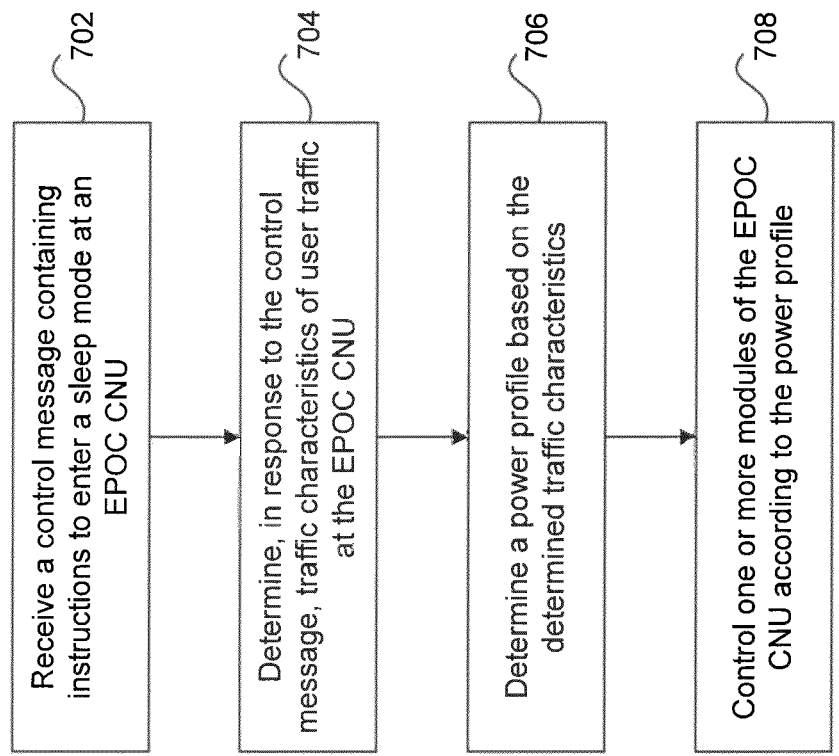
FIG. 7 is a process flowchart of a method for power saving in an EPOC CNU according to an embodiment of the present disclosure.

FIG. 7 is a process flowchart 700 of a method for power saving in an EPOC CNU according to an embodiment of the present disclosure. As shown in FIG. 7, process 700 begins in step 702, which includes receiving a control message containing instructions to enter a sleep mode. In an embodiment, the control message includes an EPON OAM message sent by an OLT. In an embodiment, the control message is received by an EPON MAC module of the CNU. In another embodiment, the control message is sent over an RF PHY channel from the CMC. Once received at the CNU, the CNU will immediately begin to discard the downstream spectrum. Accordingly, fast turn ON/OFF of the downstream channel at the CNU can be enabled. In an embodiment, the CMC may use this control message on a packet by packet basis based on the downstream LLID.

Process 700 then proceeds to step 704, which includes determining, in response to the control message, traffic characteristics of user traffic at the EPOC CNU. In an embodiment, step 704 is performed by a traffic detection module of the CNU. The traffic characteristics may include, for example and without limitation, one or more of presence of upstream data traffic, absence of upstream data traffic, presence of downstream data traffic, absence of downstream data traffic, presence/absence of active joined multicast groups, and upstream bandwidth capacity usage.

Process 700 then proceeds to step 706, which includes determining a power profile based on the determined traffic characteristics. In an embodiment, step 706 is performed by a power manager module of the CNU. The power profile determines a power down time and a wake time and specifies one or more modules of the CNU to power down during the power down time.

Finally, process 700 terminates with step 708, which includes controlling one or more modules of the EPOC CNU according to the power profile. In an embodiment, step 708 is performed by the power manager module of the CNU, and includes powering down one or more modules according to the determined power profile. In an embodiment, the traffic characteristics indicate the absence of upstream data traffic, and step 708 further includes powering down radio frequency RF TX circuitry and a DAC of the EPOC CNU for the power down time defined by the sleep mode. In another embodiment, the traffic characteristics indicate the absence of downstream data traffic, and step 708 further includes powering down RF RX circuitry and an ADC of the EPOC CNU for the power down time defined by the sleep mode.

In yet another embodiment, the traffic characteristics indicate that the upstream bandwidth capacity usage is below a predefined threshold, and step 708 further includes powering down one or more of the RF TX circuitry, the DAC, the RF RX circuitry, and the ADC of the EPOC CNU for the power down time defined by the sleep mode. Alternatively, when the upstream bandwidth capacity usage is below the predefined threshold, step 708 further includes performing one or more of (a) reducing a number of frequency sub-carriers used for upstream transmission; (b) reducing frequencies of frequency sub-carriers used for upstream transmission; (c) reducing a modulation order used for upstream transmission; and (d) reducing a symbol rate of the transmitter.

Figure 8:
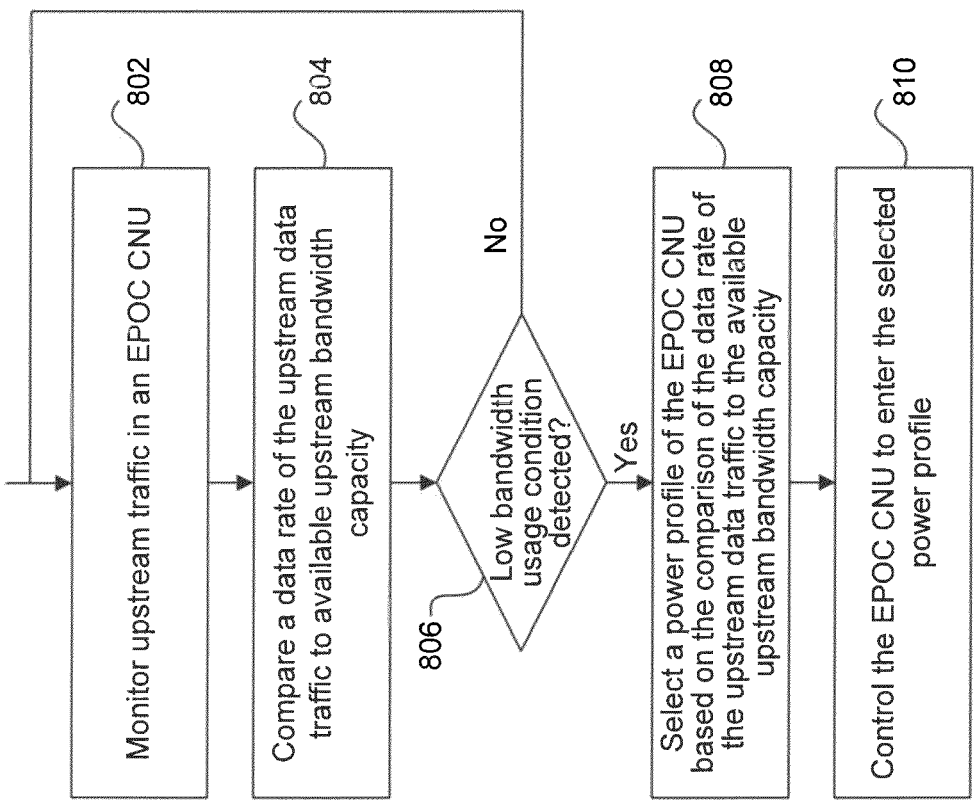
FIG. 8 is another process flowchart of a method for power saving in an EPOC CNU according to an embodiment of the present disclosure.

FIG. 8 is a process flowchart 800 of another method for power saving in an EPOC CNU according to an embodiment of the present disclosure. Process 800 may be performed by the EPOC CNU independently from process 700 described above in FIG. 7. Thus, processes 700 and 800 may be performed at the same time or at different times.

As shown in FIG. 8, process 800 begins in step 802, which includes monitoring upstream data traffic in the EPOC CNU. In an embodiment, step 802 is performed by a traffic detection module of the CNU. The traffic detection module may monitor bit streams through a PHY module of the EPOC CNU, which interfaces the CNU with a UNI.

Process 800 then proceeds to step 804, which includes comparing a data rate of the upstream data traffic to available upstream bandwidth capacity. In an embodiment, step 804 is also performed by the traffic detection module of the EPOC CNU. Based on the comparison, if a low bandwidth usage condition is detected in step 806 (e.g., the data rate of the upstream data traffic is below a predefined threshold of the available upstream bandwidth capacity), process 800 proceeds to step 808. Otherwise, process 800 returns to step 802.

Step 808 includes selecting a power profile of the EPOC CNU based on the comparison of the data rate of the upstream data traffic to the available upstream bandwidth capacity. In an embodiment, step 808 is performed by a power manager module of the EPOC CNU. In an embodiment, different power profiles may be selected depending on the ratio of the data rate of the upstream data traffic to the available upstream bandwidth capacity. The power profile may include one or more transmission re-configurations to reduce the amount of power used for upstream transmission.

Finally, process 800 terminates with step 810, which includes controlling the EPOC CNU to enter the selected power profile. In an embodiment, step 810 is performed by the power manager module of the EPOC CNU. In an embodiment, step 810 may include one or more of (a) controlling an EPOC PHY module of the EPOC CNU to reduce a number of frequency sub-carriers used for upstream transmission by the EPOC CNU; (b) controlling the EPOC PHY module to reduce the frequencies of frequency sub-carriers used for upstream transmission by the EPOC CNU (this can reduce power consumption as lower power is typically needed to transmit over lower frequencies than higher frequencies, due to lower attenuation on lower frequencies); (c) controlling the EPOC PHY module to reduce a modulation order used for upstream transmission by the EPOC CNU; and (d) controlling the EPOC PHY to reduce a symbol rate of the transmitter.

Note that, in embodiments, the EPOC CNU may perform process 800 and select to enter a sleep mode without need to notify the OLT. For instance, EPOC CNU may select to reduce its upstream data rate to save power without notifying the OLT. This flexibility is enabled by systems and methods that allow EPON MAC traffic to be sub-rated by the EPOC portion of a hybrid EPON-EPOC network without the end-to-end EPON MAC link being aware of the sub-rating. Detailed description of these sub-rating systems and methods can be found in U.S. patent application Ser. No. 13/163,283, filed Jun. 17, 2011, which is incorporated herein by reference in its entirety.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. An Ethernet Passive Optical Network Over Coaxial (EPOC) Coaxial Network Unit (CNU), comprising:
    an Ethernet Passive Optical Network (EPON) medium access control (MAC) module configured to receive a control message, the control message containing instructions to enter a sleep mode;
    a radio frequency (RF) module, configured to couple the EPOC CNU to a coaxial cable;
    an EPOC physical layer (PHY) module, coupled between the EPON MAC module and the RF module;
    a traffic detection module configured to determine traffic characteristics of user traffic at the EPOC PHY module in response to the control message; and
    a power manager module configured to determine a power profile based on the determined traffic characteristics and to control one or more modules of the EPOC CNU according to the power profile in order to enter the sleep mode,
    wherein the traffic characteristics indicate an upstream bandwidth capacity usage is below a predefined threshold, and wherein the power manager module is configured to control the EPOC PHY module to reduce at least one of: frequencies of frequency sub-carriers used for upstream transmission; a modulation order used for upstream transmission; or a symbol rate used for upstream transmission.

2. The EPOC CNU of claim 1, wherein the traffic characteristics indicate one or more of: presence of upstream data traffic, absence of upstream data traffic, presence of downstream data traffic, absence of downstream data traffic, presence of active joined multicast groups, and the upstream bandwidth capacity usage.

3. The EPOC CNU of claim 2, wherein the RF module further comprises:
    RF transmit (TX) circuitry configured to transmit a first RF signal onto the coaxial cable; and
    RF receive (RX) circuitry configured to receive a second RF signal from the coaxial cable,
    and wherein the EPOC CNU further comprises:
        a digital-to-analog converter (DAC), coupled to the RF TX circuitry; and
        an analog-to-digital converter (ADC), coupled to the RF RX circuitry.

4. The EPOC CNU of claim 3, wherein the traffic characteristics indicate the absence of upstream data traffic, and wherein the power manager module is further configured to power down the RF TX circuitry and the DAC for a duration defined by the sleep mode.

5. The EPOC CNU of claim 3, wherein the traffic characteristics indicate the absence of downstream data traffic, and wherein the power manager module is further configured to power down the RF RX circuitry and the ADC for a duration defined by the sleep mode.

6. The EPOC CNU of claim 3, wherein the traffic characteristics indicate the upstream bandwidth capacity usage is below the predefined threshold, and wherein the power manager module is configured to power down the RF TX circuitry, the DAC, the RF RX circuitry, and the ADC for a duration defined by the sleep mode.

7. The EPOC CNU of claim 1, wherein the power manager module is further configured to control the EPOC PHY to reduce a number of frequency sub-carriers used for upstream transmission.

8. The EPOC CNU of claim 3, wherein the RF module further comprises a pilot recovery module, the pilot recovery module configured to extract a pilot tone from the second RF signal and to provide the pilot tone to the EPOC PHY module.

9. An Ethernet Passive Optical Network Over Coaxial (EPOC) Coaxial Network Unit (CNU), comprising:
   an Ethernet Passive Optical Network (EPON) medium access control (MAC) module configured to receive a control message, the control message containing instructions to enter a sleep mode;
   a physical layer (PHY) module, coupled between the EPON MAC module and a user-network interface (UNI);
   a traffic detection module configured to determine traffic characteristics of user traffic by monitoring bit streams at the PHY module in response to the control message; and
   a power manager module configured to determine a power profile based on the determined traffic characteristics and to control one or more modules of the EPOC CNU according to the power profile in order to enter the sleep mode.

10. The EPOC CNU of claim 1, wherein the control message includes an Operation, Administration, and Maintenance (OAM) message.

11. A method for power saving in an Ethernet Passive Optical Network Over Coaxial (EPOC) coaxial network unit (CNU), comprising:
   receiving a control message containing instructions to enter a sleep mode;
   determining traffic characteristics of user traffic at a physical layer (PHY) module in response to the control message;
   determining a power profile based on the determined traffic characteristics; and
   controlling one or more modules of the EPOC CNU according to the power profile in order to enter the sleep mode,
   wherein the traffic characteristics indicate the upstream bandwidth capacity usage is below a predefined threshold, and wherein said controlling comprises reducing at least one of: frequencies of frequency sub-carriers used for upstream transmission; a modulation order used for upstream transmission; or a symbol rate used for upstream transmission.

12. The method of claim 11, wherein the traffic characteristics indicate one or more of: presence of upstream data traffic, absence of upstream data traffic, presence of downstream data traffic, absence of downstream data traffic, presence of active joined multicast groups, and the upstream bandwidth capacity usage.

13. The method of claim 12, wherein the traffic characteristics indicate the absence of upstream data traffic, and wherein said controlling comprises powering down radio frequency (RF) transmit (TX) circuitry and a digital-to-analog converter (DAC) of the EPOC CNU for a duration defined by the sleep mode.

14. The method of claim 12, wherein the traffic characteristics indicate the absence of downstream data traffic, and wherein said controlling comprises powering down radio frequency (RF) receive (RX) circuitry and an analog-to-digital converter (ADC) of the EPOC CNU for a duration defined by the sleep mode.

15. The method of claim 12, wherein said controlling comprises powering down radio frequency (RF) transmit (TX) circuitry, a digital-to-analog converter (DAC), RF receive (RX) circuitry, and an analog-to-digital converter (ADC) of the EPOC CNU for a duration defined by the sleep mode.

16. The method of claim 12, wherein said controlling comprises reducing a number of frequency sub-carriers used for upstream transmission.

17. The method of claim 11, wherein determining traffic characteristics comprises:
   selecting a packet type;
   inspecting packets passing through the PHY module; and
   determining the traffic characteristics based on the packets passing through the PHY module that are of the selected packet type.

18. A method for power saving in an Ethernet Passive Optical Network Over Coaxial (EPOC) coaxial network unit (CNU), comprising:
   monitoring upstream data traffic in a physical layer (PHY) module of the EPOC CNU;
   comparing a data rate of the upstream data traffic to available upstream bandwidth capacity;
   selecting a power profile of the EPOC CNU based on the comparison of the data rate of the upstream data traffic to the available upstream bandwidth capacity; and
   controlling the EPOC CNU to enter the power profile in order to enter a sleep mode,
   wherein the data rate of the upstream data traffic is below a predefined threshold of the available upstream bandwidth capacity, and wherein controlling the EPOC CNU comprises controlling the PHY module of the EPOC CNU to reduce frequencies of frequency sub-carriers used for upstream transmission by the EPOC CNU.

19. The method of claim 18, wherein controlling the EPOC CNU further comprises:
   controlling the PHY module of the EPOC CNU to reduce a number of frequency sub-carriers used for upstream transmission by the EPOC CNU.

20. The method of claim 18, wherein controlling the EPOC CNU further comprises:
   controlling the PHY module of the EPOC CNU to reduce a modulation order used for upstream transmission by the EPOC CNU.

21. The method of claim 18, wherein controlling the EPOC CNU further comprises:
   controlling the PHY module of the EPOC CNU to reduce a symbol rate used for upstream transmission by the EPOC CNU.

* * * * *